United States Patent [19]

Sleep et al.

[11] Patent Number: 4,462,313

[45] Date of Patent: Jul. 31, 1984

[54] APPARATUS FOR SHUTTLING DRIVERLESS VEHICLES

[75] Inventors: Craig F. Sleep, Bangor; Stanley K. Gutekunst, Nazareth, both of Pa.

[73] Assignee: SI Handling Systems, Inc., Easton, Pa.

[21] Appl. No.: 328,280

[22] Filed: Dec. 7, 1981

[51] Int. Cl.³ .............................................. B61J 1/10
[52] U.S. Cl. ...................................... 104/50; 104/48; 104/166
[58] Field of Search .................. 104/48, 50, 165, 166; 198/586

[56] References Cited

U.S. PATENT DOCUMENTS

| | | | |
|---|---|---|---|
| 1,550,754 | 8/1925 | Sockman | 104/50 X |
| 2,922,381 | 1/1960 | Horni | 104/48 |
| 3,690,267 | 9/1972 | Sutton | 104/165 |
| 3,861,322 | 1/1975 | Danly | 104/166 |
| 3,929,079 | 12/1975 | Eliassen | 104/48 X |
| 4,132,174 | 1/1979 | Ziegenfus et al. | 104/48 |

Primary Examiner—Randolph Reese
Attorney, Agent, or Firm—Seidel, Gonda & Goldhammer

[57] ABSTRACT

A driverless shuttle vehicle transfers driverless vehicles between first and second parallel tracks. The shuttle vehicle has a track thereon adapted to be aligned with each of the first and second tracks. A motor adjacent each end of the first and second tracks is adapted to selectively move the shuttle vehicle track horizontally toward the end of its associated track for loading and unloading of a driverless vehicle.

9 Claims, 6 Drawing Figures

APPARATUS FOR SHUTTLING DRIVERLESS VEHICLES

BACKGROUND

A shuttle vehicle for transferring driverless vehicles of the type involved herein is known. For example, see U.S. Pat. No. 4,132,174.

SUMMARY OF THE INVENTION

The driverless shuttle vehicle of the present invention includes a body having wheels for moving along rails therebelow. A track is supported on the body. The track has rails for contact with wheels of a driverless vehicle adapted to be supported thereby. Said track is coupled to the body in a manner so that the track can move horizontally a short distance relative to the body from a neutral position to an operative position for loading or unloading of a driverless vehicle.

The shuttle vehicle of the present invention is adapted for use in a conveyor system having first and second elevated tracks. A third track is provided below the elevation of and extending between ends of the first and second tracks. The driverless shuttle vehicle rides on said third track and is adapted to receive a driverless vehicle from the first track and transfer it to the second track. A motor is provided for causing the shuttle vehicle to move along the third track and stop adjacent the ends of the first and second tracks. A discrete motor means is provided adjacent each end of the first and second tracks for moving the track on the shuttle vehicle to its operative position.

It is an object of the present invention to provide a novel driverless shuttle vehicle and track system.

It is another object of the present invention to provide a driverless shuttle vehicle having a horizontally movable track thereon for movement between a neutral position and an operative position for loading or unloading of a driverless vehicle.

Other objects and advantages will appear hereinafter.

For the purpose of illustrating the invention, there is shown in the drawing a form which is presently preferred; it being understood, however, that this invention is not limited to the precise arrangements and instrumentalities shown.

DETAILED DESCRIPTION

Figure 1:
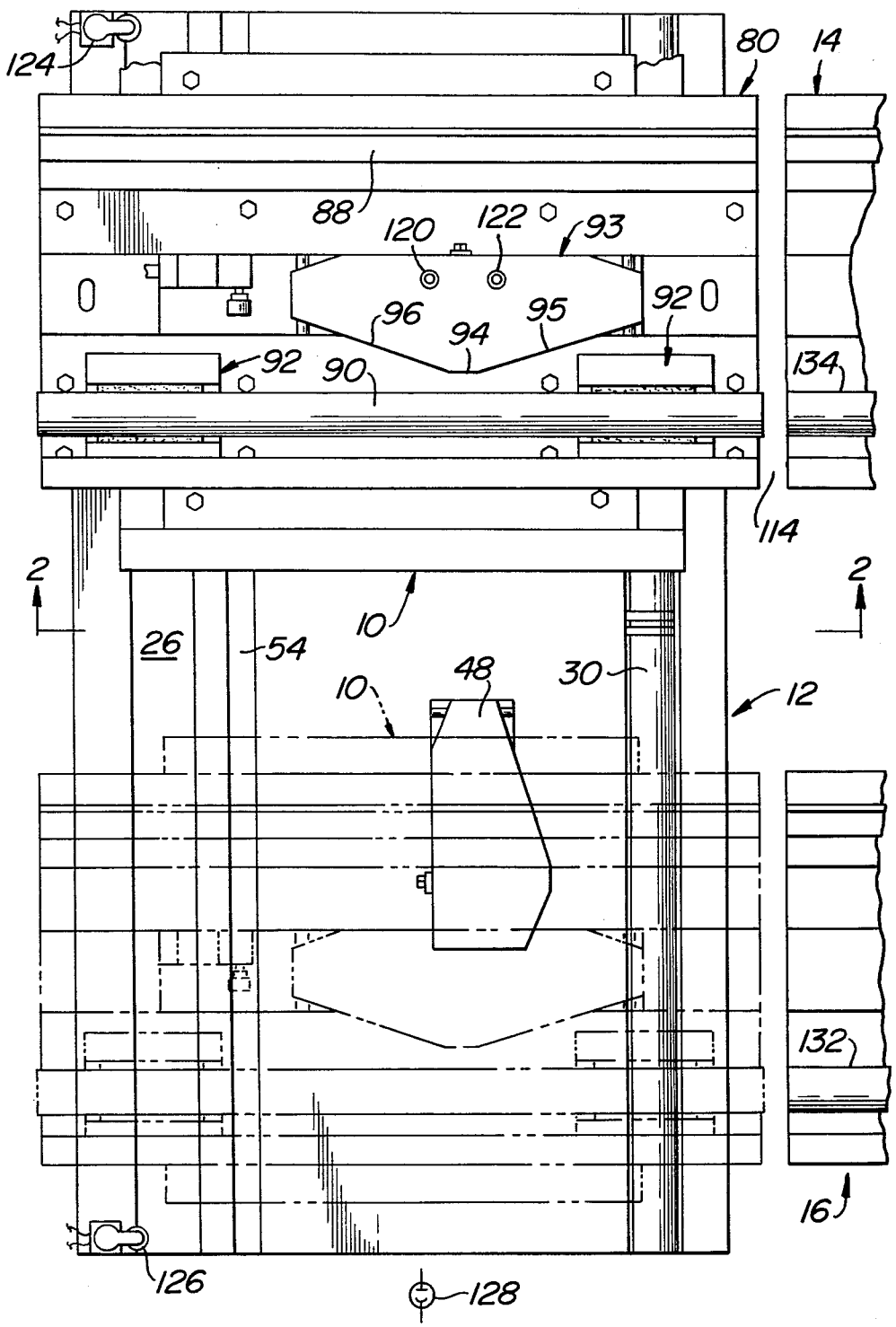
FIG. 1 is a top plan view of a conveyor system incorporating the shuttle vehicle.

Referring to the drawings in detail, wherein like numerals indicate like elements, there is shown in FIG. 1 a driverless shuttle vehicle forming part of the present invention and designated generally as 10. The shuttle vehicle 10 rides on a track 12 which extends between the ends of elevated tracks 14 and 16. The track 12 is mounted directly on the floor whereas tracks 14 and 16 are elevated from the floor so that their bottom surface is about 63 centimeters from the floor.

Figure 2:
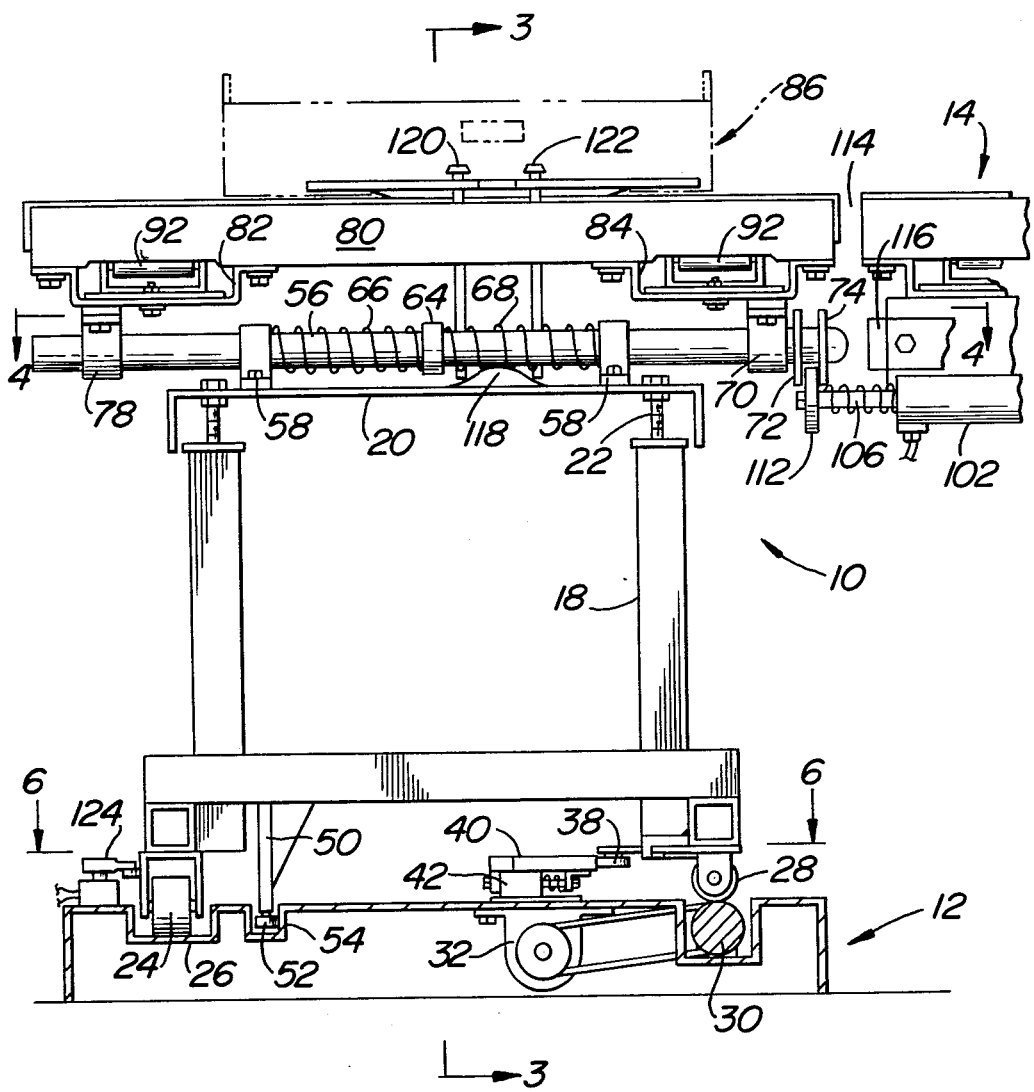
FIG. 2 is a sectional view taken along the line 2—2 in FIG. 1.
Figure 3:
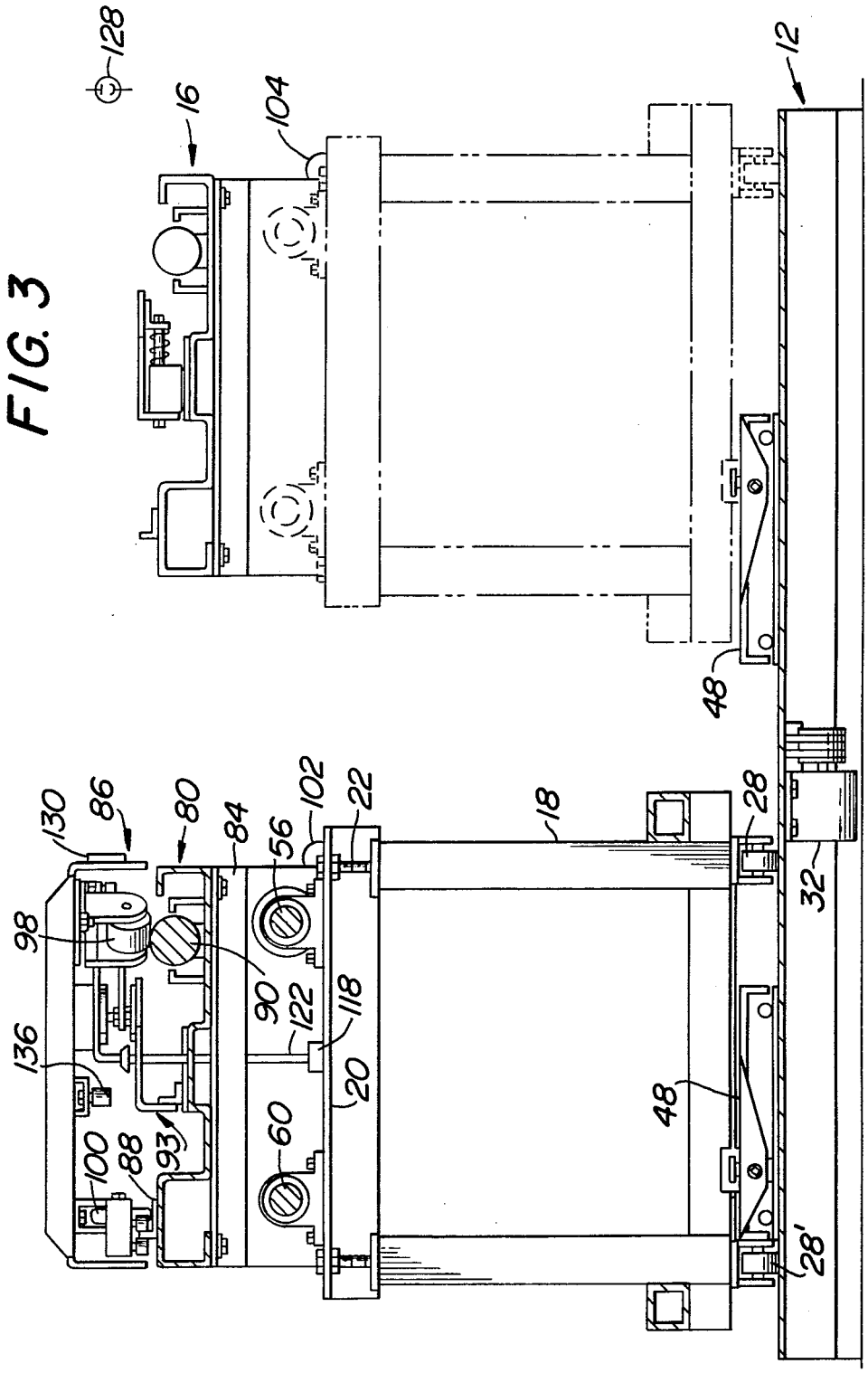
FIG. 3 is a sectional view taken along the line 3—3 in FIG. 2.

The shuttle vehicle 10, as shown more clearly in FIGS. 2 and 3, includes a body of open framework designated generally as 18. A horizontally disposed platform 20 is adjustably connected to the upper end of the posts forming the framework 18 by bolts 22 and nuts on opposite sides of the platform 20 to facilitate leveling and height adjustment. The body framework 18 includes an inverted U-shaped channel which supports wheels 24 along one side of the vehicle. See FIGS. 2 and 6. The track 12 includes a rail 26 along which the wheels 24 roll. The body on the opposite side includes drive wheels 28, 28' which are in frictional contact with a rail 30. Rail 30 is also a drive shaft for driving the vehicle 10 along the track 12. The drive shaft 30 is rotatably supported by longitudinally extending roller bearings adjacent its ends. A reversible motor 32 is supported by the track 12 and coupled to the drive shaft 30 by belts to facilitate rotating the shaft 30 about its longitudinal axis.

The vehicle 10 preferably is provided with a pair of drive wheels designated 28 and 28'. The wheels 28, 28' are supported by a mount which in turn is adapted to oscillate about a vertical axis. The respective mounts are connected together by a connecting rod 34. Rod 34 is biased by spring 36 to cause the drive wheels 28, 28' to pivot to a drive position. A cam follower is coupled to the connecting rod 34 and is adapted to cooperate with a traffic control device having a cam 40. Cam 40 has an acceleration and deceleration surface 44 and a dwell surface 46. See FIG. 6. Cam 40 causes the shuttle vehicle 10 to come to a stop position when the shuttle vehicle 10 is opposite the track 14. A similar cam 48 is provided for causing the shuttle vehicle 10 to stop when it is opposite the end of track 16. Each of the cams 40, 48 may be moved to an inoperative position by cylinder 42. When the cams are in their inoperative positions, the spring 36 biases the drive wheels 28, 28' to their drive position whereby the shuttle vehicle 10 will move along the track 12 in a direction dictated by the direction of rotation of the drive shaft 30.

The framework 18 has a pair of depending struts 50. Each strut 50 has a follower in the form of a roller 52. Rollers 52 are disposed within a guide channel 54 in the trach 12. See FIGS. 2 and 6. The rollers 52 cooperate with the channel 54 to prevent the vehicle from shifting transversely of the track 12.

Figure 4:
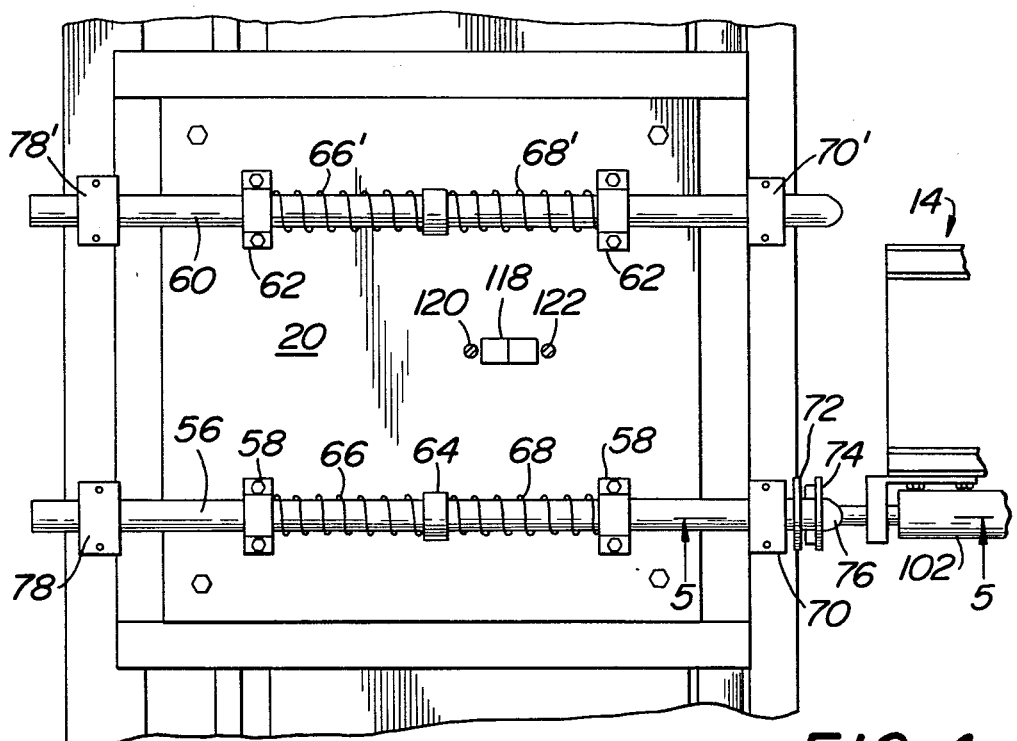
FIG. 4 is a sectional view taken along the line 4—4 in FIG. 2.

Referring to FIGS. 2 and 4, it will be noted that a pair of parallel horizontally disposed rods 56 and 60 are supported on the upper surface of the platform 20. Rod 56 is supported and guided by pillow blocks 58. Rod 60 is supported and guided by pillow blocks 62. Only rod 56 will be described in detail with corresponding primed numerals for rod 60.

Figure 6:
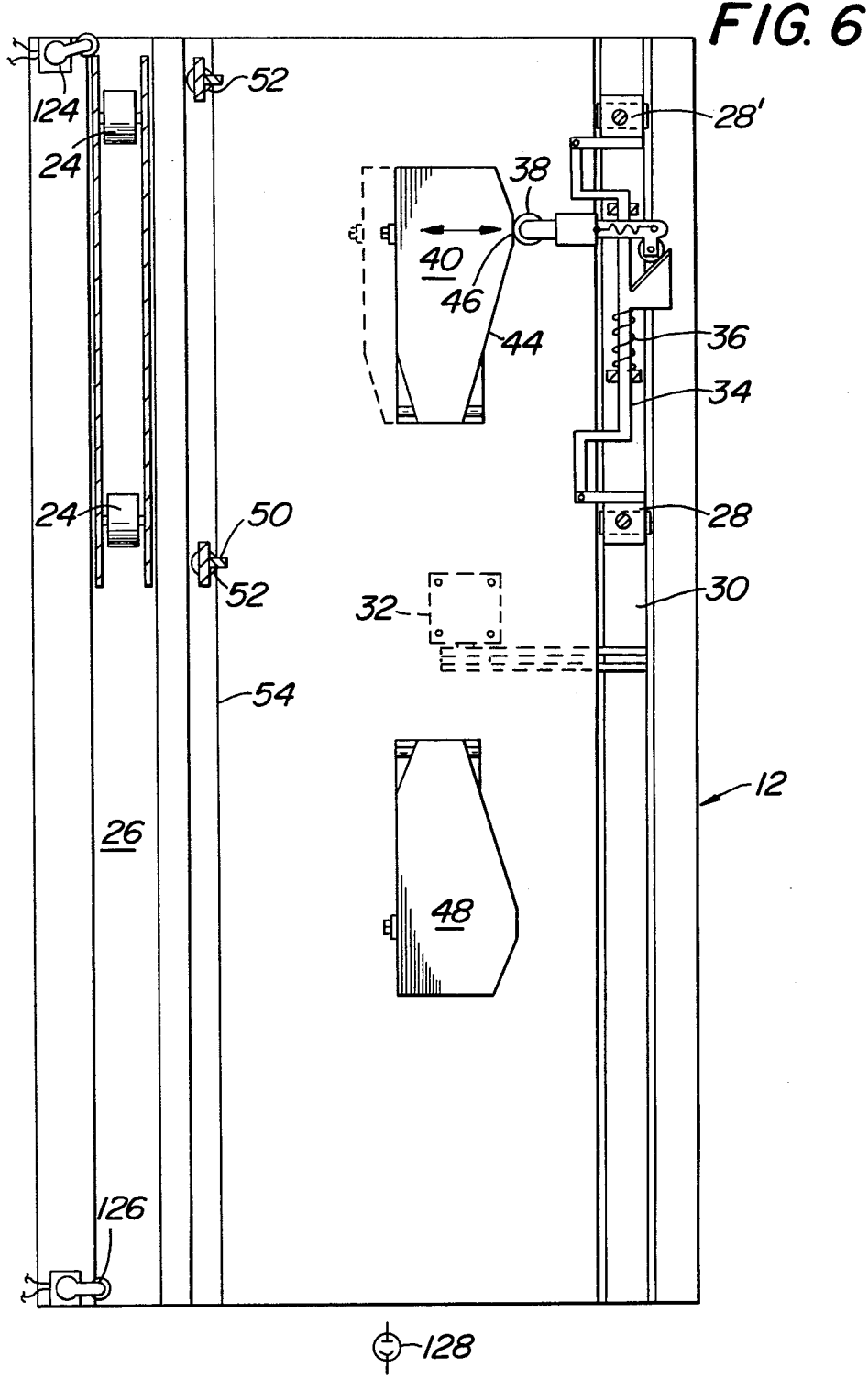
FIG. 6 is a sectional view taken along the line 6—6 in FIG. 2.

A spring 66 surrounds rod 56 and extends between one of the pillow blocks 58 and a collar 64 fixed to the rod 56. A similar spring 68 extends between the other pillow block 58 and collar 64. The rods 56, 60 are supported for horizontal reciprocation by their pillow blocks and are biased to a neutral position as shown in FIGS. 2 and 6 by the springs 66, 68, 66', 68'.

Rod 56 extends through a guide 70 secured thereto adjacent one end and through an identical guide 78 secured thereto adjacent its other end. Between the guide 70 and the nose 76 on rod 56, there is attached to rod 56 a pair of spaced plates 72, 74. Guides 78 and 78' are attached to the bottom surface of a trough 82.

Guides 70 and 70' are attached to the bottom surface of the trough 84. The troughs 82, 84 have horizontally disposed flanges bolted to a track 80. Track 80 is constructed in the same manner and is at the same elevation as the tracks 14 and 16.

As shown in FIG. 3, a driverless vehicle 86 is supported by the track 80. Track 80 has a rail 88 along one side for contact with support wheels 100 disposed along one side of the vehicle 86. Track 80 includes a second rail 90 along the opposite side of the track. Track 90 is also a drive shaft. Drive shaft 90 is in frictional contact with a drive wheel 98 on the vehicle 86 and is supported by bearing assemblies 92. Track 80 includes a stationary traffic control device 93. As shown in FIG. 1, device 93 includes a dwell surface 94 between acceleration and deceleration surfaces 95, 96. The surfaces 94—96 cooperate with a cam follower on vehicle 86 to cause drive wheel 98 to be about 2 degrees from a stop position whereby there is a small forward thrust for unloading.

A cylinder 102 is supported by the track 14 and a comparable cylinder 104 is supported by the track 16. The cylinders 102 and 104 are identical. Hence, only cylinder 102 will be described in detail.

Figure 5:
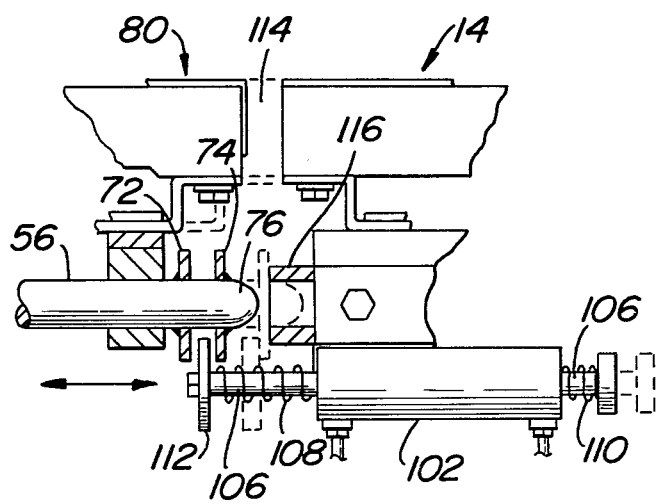
FIG. 5 is a sectional view taken along the line 5—5 in FIG. 4.

Referring to FIG. 5, cylinder 102 has a piston rod 106 extending from opposite ends thereof. A spring 108 surrounds one end portion of piston rod 106 and extends between the cylinder and a disk 112 on the piston rod. A spring 110 surrounds the opposite end portion of the piston rod 106 and extends from the cylinder to a collar on the piston rod. Motive fluid may be supplied to opposite ends of the cylinder 102 to cause a piston therein to move horizontally in the direction of the double headed arrow in FIG. 5. When the shuttle vehicle 10 is in the position shown in FIGS. 2 and 5, the disk 112 is disposed between the plates 72 and 74. If the piston rod 106 is stroked to the right in FIG. 5, it will cause the track 80 and any vehicle 86 thereon to move toward the right in FIG. 5 and thereby close the gap 114. At the same time, the nose 76 on rod 56 will enter the collar 116 and thereby lock the shuttle vehicle in place during loading and unloading of vehicle 86.

A cam 118 is attached to the top surface of platform 20 between the rods 56 and 60. See FIGS. 2 and 4. Vertically disposed rods 120 and 122 are supported by the track 80 adjacent opposite ends of the cam 118. The rods 120 and 122 terminate at their upper end in limit stops.

Switches 124 and 126 are attached to the track 12 adjacent ends thereof and are tripped by the shuttle vehicle 10 to indicate that the shuttle vehicle 10 is in position to load or unload a vehicle 86. It is preferred to provide a device such as photocell 128 adjacent one end of the track 12 for detecting that a vehicle 86 is mounted on the track 80. In this regard, vehicle 86 may be provided on a side wall thereof with reflective tape 130. A conventional support stand for photocell 128 is not shown.

Operation of the system is as follows. Assuming the vehicle 10 is in the phantom position shown in FIG. 1. Limit switch 120 will be tripped to thereby cause cylinder 104 to shift track 80 toward track 16 and close the gap 114. Springs 68 and 68' are thereby compressed and rod 120 is elevated. The drive shaft 90 will frictionally engage end to end with drive shaft 132 in track 116. With drive shafts 90 and 132 rotating in the same direction, and shaft 90 driven by shaft 132, a vehicle 86 will transfer onto the track 80 and will be caused by device 93 to decelerate until stopped by contact between rod 120 and limit stop 136. In such position, the photocell 128 will detect the presence of the vehicle 86 and close a circuit which causes cylinder 104 to be vented to atmosphere. Springs 68 and 68' will expand and shift the track 80 to the neutral position as shown in FIGS. 2 and 4. Also, the photocell will initiate operation of the motor 32 in a direction to cause the vehicle 10 to move from the phantom position in FIG. 1 to the solid line position in FIG. 1.

When the vehicle 10 arrives at the position as shown in solid lines in FIG. 1, the cam 40 will contact cam follower 38 and decelerate the vehicle 10 in a smooth manner and then cause the vehicle 10 to come to a stop whereby tracks 14 and 80 are aligned with one another as shown in FIG. 1. Switch 124 will be tripped to so indicate such relationship. When that relationship exists, the disk 112 will be between the plates 72, 74 as shown in FIG. 2. Tripping of switch 124 will cause activation of cylinder 102 whereby piston rod 106 will move from left to right in FIGS. 2 and 5. Nose 76 will enter the collar 116 and lock the shuttle vehicle 10 in place. Since the guides 70, 78 are fixedly secured to rod 56, track 80 will shift from left to right in FIGS. 2 and 5 thereby closing the gap 114. Springs 68 and 68' are thereby compressed. Drive shaft 50 will now be in frictional engagement with the end of drive shaft 134. As mentioned above, drive wheel 98 is at a slight angle so that there will be a force to unload vehicle 86 when drive wheel 98 is driven by shaft 90. Hence, shaft 134 now drives shaft 90 in a direction so as to cause the vehicle 86 to transfer off track 80 and onto track 14. When the vehicle 86 is on track 14, it will trip a microswitch which vents the cylinder 102. Spring 68 and 68' expand and return the track 80 to the neutral position shown in FIGS. 2 and 5.

When the track 80 shifted so as to close the gap 114, rod 120 was raised by contact with cam 118 to a position so as to block the limit stop 136 on vehicle 86 so as to prevent the vehicle 86 from moving in an opposite direction from that intended. Cylinders 102 and 104 are double acting cylinders. Thus, cylinder 102 can shift the track 80 in a direction away from track 14 and toward another track at the same elevation as track 14. In that event, springs 66 and 66' would be compressed and rod 122 would be elevated by cam 118 to prevent the vehicle from traveling inadvertently in the wrong direction. Thus, the shuttle vehicle 10 can transfer vehicle 86 in opposite directions onto track 14 or a track not shown which is directly opposite track 14. Whenever cylinder 102 is vented, the springs surrounding the rods 56, 60 reposition the track 80 in a neutral position. Thereafter, the sequence of events may be repeated.

As will be apparent from FIG. 3, there is provided a passageway between the tracks 14 and 16 to facilitate access by persons and/or machinery adapted to be disposed between the tracks 14, 16. The track 12 preferably has a low profile of about 12 centimeters whereby it is an easy matter for a person to step on top of track 12 and walk into the space between tracks 15 and 16. Such access is possible even though drive shaft 30 is rotating since the drive shaft is disposed in a channel in the track 12 as shown more clearly in FIG. 2. Tracks 14 and 16 are preferably part of an endless conveyor system with a shuttle vehicle 10 at each end of the tracks 14 and 16.

The present invention may be embodied in other specific forms without departing from the spirit or essential attributes thereof and, accordingly, reference should be made to the appended claims, rather than to the foregoing specification, as indicating the scope of the invention.

We claim:

1. A driverless shuttle vehicle for use in an automated system comprising a body having wheels adapted for movement along rails therebelow, a track supported by said body, said track having rails for contact with wheels of a driverless vehicle adapted to be supported thereby, one of said rails being a drive shaft supported for rotation about its longitudinal axis and being horizontally disposed, means coupling said track to said body so that said track can reciprocate horizontally a short distance relative to the body from an inoperative position to an operative position, in its operative position said track being arranged for loading or unloading of a driverless vehicle, and said track including a traffic control device having a cam surface for contact with a cam follower on a driverless vehicle adapted to be supported thereby, said track being arranged on said body so as to be non-rotatable with respect to the body, said track having means on one end portion thereof for engagement with a motor external of the vehicle and which is adapted to move said track to said operative position.

2. A shuttle vehicle in accordance with claim 1 wherein said wheels include support wheels along one side of the body and drive wheels along the opposite side of the body.

3. Apparatus for shuttling driverless vehicles comprising first and second elevated tracks, a third track below the elevation of and extending between ends of said first and second tracks, a driverless shuttle vehicle on said third track and adapted to receive a driverless vehicle from the first track and transfer it to the second track, motor means for causing said shuttle vehicle to move along said third track, means for causing said shuttle vehicle to stop adjacent the ends of said first and second tracks, said shuttle vehicle including a body, a fourth track supported by said body adjacent the elevation of said first and second tracks, said fourth track being supported by said body in a manner so that it can reciprocate horizontally a short distance relative to the body in a direction toward one of said first and second tracks, said fourth track including a drive shaft along one side thereof and adapted for frictional end to end engagement with a drive shaft of said first and second tracks as a result of said movement so that said fourth track is in such position for loading or unloading of a driverless vehicle, and means including a discrete motor adjacent each end of the first and second tracks for moving said fourth track in said direction when said shuttle vehicle is adjacent thereto to facilitate loading and unloading of a driverless vehicle from said fourth track relative to one of said first and second tracks.

4. Apparatus in accordance with claim 3 wherein said fourth track is spring biased to a neutral position on said body wherein said fourth track is spaced from the ends of said first or said second track by said short distance.

5. Apparatus in accordance with claim 3 including means for locking said shuttle vehicle to one of said first and second tracks during loading or unloading of the fourth track.

6. Apparatus in accordance with claim 3 wherein said fourth track is supported for horizontal movement in opposite directions relative to a neutral position on said body, and said motor means being adapted to move said track in said opposite directions.

7. Apparatus in accordance with claim 3 wherein said fourth track has a pair of spaced surfaces positionable adjacent the ends of the first and second tracks when the shuttle vehicle is adjacent its loading and unloading positions, said spaced surfaces being arranged to cooperate with said motors to facilitate said reciprocatory movement of said fourth track.

8. A driverless shuttle vehicle for use in an automated system comprising a body having wheels adapted for movement along rails therebelow, a track supported by said body, said track having rails for contact with wheels of a driverless vehicle adapted to be supported thereby, one of said rails being a drive shaft supported for rotation about its longitudinal axis and being horizontally disposed, means coupling said track to said body so that said track can reciprocate horizontally a short distance relative to the body from an inoperative position to an operative position, said means including a pair of rods supported by said body for horizontal movement, spring means biasing said rods to an inoperative position, said track being connected to said rods for movement therewith, means on at least one of said rods for enabling said rods and track to be moved by a motor relative to said body from the inoperative position to the operative position, in its operative position said track being arranged for loading or unloading of a driverless vehicle, said track including a traffic control device having a cam surface for contact with a cam follower on a driverless vehicle adapted to be supported thereby, and said track being arranged on said body so as to be non-rotatable with respect to the body.

9. A shuttle vehicle in accordance with claim 8 including a horizontal platform vertically adjustable on said body, said rods being supported by said platform below said track.

* * * * *